UNITED STATES PATENT OFFICE 1,930,185

PROCESS OF TREATMENT OF CHICORY

Raymond E. Schanzer, New Orleans, La.

No Drawing. Application February 14, 1933
Serial No. 656,762

1 Claim. (Cl. 99—11)

This invention relates to a process of treatment of chicory with chicory flour producing a type of chicory of uniform color and consistency resembling that of ground coffee.

When sufficiently roasted chicory is ground to a granulation of the same size of ground coffee there is usually a quantity of very fine grain almost like powder which has to be sifted out. This powder is then put through a pulverizer which reduces it to the fineness of flour. The granulated chicory is then dampened either by steam or water which has the effect of making it sticky. In this state it is put through a conveyor where the chicory flour is added, which has the effect of coating each individual grain of chicory, thereby giving it a very uniform and attractive appearance, resembling granulated coffee, more similar to the coffee than it looked when the chicory was first ground after being roasted.

The powder derived from grinding chicory roots cannot be utilized for the blending process to improve the appearance of the granulated chicory until such powder is subjected to an additional grinding or pulverizing to the consistency of fine flour, when the dampening of the chicory and the subsequent blending with the fine flour powder results.

In putting chicory through the above process the salability is enhanced considerably due to its more attractive appearance in the nature of uniformity of color resembling ground coffee, making it a more desirable article for blending with coffee or coffee substitutes.

The process is as follows:

By adding to the granulated chicory which has been put into a mixing or conveying device a necessary quantity of steam or water, the chicory becomes sticky and is conditioned for an application of chicory flour which latter has a tendency for coating each individual grain thereby giving the granulated chicory a uniform color. Should the chicory still not be uniform enough then another application of chicory flour is given while the chicory is yet sticky and moist. Then the blended chicory is subjected to a drying process in the course of which an additional quantity of chicory flour is mixed with it. When the chicory is sufficiently dry it is run over a separating machine where any excess flour is sifted therefrom leaving only the granulated blended chicory.

This process of coating chicory with chicory flour can also be applied to the blending of other coffee cereals such as roasted and ground rye, wheat or barley and it is to be understood that the process may be applied to these and other commodities.

Chicory root roasted and ground has an appearance which lacks in uniformity of color. This is due to the fact that in roasting chicory roots the individual pieces of the roots do not roast uniformly through and through on account of variations in the size of the pieces of roots as well as differences in physical composition. In selling roasted and ground chicory the buyer lays a great deal of stress on uniformity of color. With the present process the granulated chicory is given a uniform color without using any foreign ingredients thereby producing a superior commodity in appearance and consequently much more salable.

I claim:

The process for treating chicory or other coffee substitutes for producing uniform appearance in the commodity, consisting in granulating the chicory, dampening the granulated chicory, applying chicory flour to the dampened granules thereby coating the same and finally roasting the mass to cause the flour to adhere to the granules and whereby a product of uniform color is produced.

RAYMOND E. SCHANZER.